United States Patent Office 3,531,247
Patented Sept. 29, 1970

3,531,247
PROCESS FOR THE PRODUCTION OF FINELY-DIVIDED METAL OXIDES BY MULTIPLE OXIDATION
Alan Edward Comyns, Pittsburgh, Pa., and Derek Howden, Middlesbrough, England, assignors to British Titan Products Company Limited, Billingham, England, a corporation of the United Kingdom
Continuation-in-part of application Ser. No. 508,144, Nov. 16, 1965. This application July 2, 1969, Ser. No. 840,598
Claims priority, application Great Britain, Nov. 27, 1964, 48,305/64
Int. Cl. C01g 23/04
U.S. Cl. 23—202                                    17 Claims

ABSTRACT OF THE DISCLOSURE

A process for producing finely-divided metal oxides, particularly white metal oxides such as titanium dioxide, is described. A stream of hot gas containing initially solid, fine particles of metal oxide is produced by the interaction of a first oxygenating gas, a fuel gas and a first oxidizable metal halide. The particle-containing stream is then passed to a reaction zone into which a second oxidizable metal halide and a second oxygenating gas are introduced. At least one of the reactants is introduced through a plurality of inlets longitudinally of the gas flow. The second metal halide is converted to metal oxide by the second oxygenating gas and finely-divided metal oxide is then recovered from the reaction zone.

RELATED APPLICATIONS

This application is a continuation-in-part of U.S. Ser. No. 508,144, filed Nov. 16, 1965, now abandoned. Priority is claimed from British application No. 48,305/64, filed on Nov. 27, 1964.

The present invention relates to a process for the production of a finely-divided metal oxide by the vapor phase oxidation of a corresponding metal halide.

In copending U.S. Pat. application No. 254,007, of Arkless and Groves, now abandoned, there is described and claimed an improved process for the production of finely-divided metal oxides. The process of No. 254,007 comprises passing into a reaction zone a stream of hot gas containing initial solid particles of smaller average particle size than that of the metal oxide to be produced; intrdoucing into the reaction zone a metal halide and an oxygenating gas, at least one of these reactants being introduced through a plurality of inlets spaced along the length of the zone in the direction of the gas flow; the temperature of the gas stream in the reaction zone being such that the metal halide and oxygenating gas will react to form metal oxide; and thereafter recovering finely-divided metal oxide from the reaction zone.

Various methods are described in No. 254,007 for the production of the hot gas stream containing solid particles which is passed into the reaction zone.

It is an object of the present invention to provide an improvement in or modification of the process described and claimed in No. 254,007.

Accordingly, the present invention is a process for the production of finely-divided metal oxide comprising forming an initial gas mixture containing the vapor of a first oxidizable metal halide, a first oxygenating gas and a fuel gas, the quality of the fuel gas being at least sufficient to maintain the necessary temperature for the first metal halide to be converted to the corresponding oxide by the first oxygenating gas on the burning of the fuel; burning the initial gas mixture so as to produce a stream of hot gas containing initial solid particles of metal oxide of smaller mean particle size than that of the metal oxide to be produced; passing such stream of hot gas containing such initial solid particles into a reaction zone; introducing into the reaction zone a second oxidizable metal halide and a second oxygenating gas, at least one of these two reactants being introduced through a plurality of inlets spaced along the length of the zone in the direction of the gas flow; maintaining the necessary temperature in the reaction zone for the second metal halide to be converted to metal oxide by the second oxygenating gas; and thereafter recovering finely-divided metal oxide from the reaction zone.

The initial gas mixture is desirably a substantially homogeneous mixture.

The first and second metal halides may be the same or different halides. As the invention is particularly useful in the production of finely-divided titanium dioxide, titanium tetrahalide is a preferred second metal halide. Titanium tetrahalide may also be the first metal halide. The first metal halide may, however, be any oxidizable metal halide which forms a finely-divided white metal oxide upon oxidation, for example an aluminium, zirconium or silicon halide (silicon is referred to as a metal in this specification), even when the second metal halide is a titanium tetrahalide. The metal halides are preferably chlorides. In the case of the metals named above, they are normally tetrahalides (except, of course, for the aluminium halide which is normally a trihalide).

The first and second oxygenating gases may be the same or different gases. Of course, each oxygenating gas must be able to oxidize the metal halide with which it is reacted to the corresponding oxide. At least the oxygenating gas must also allow the fuel to burn without having any marked detrimental effect upon the finely-divided metal oxide produced; this is particularly important if the metal oxide is to be a pigment. Generally, it is preferable that the first and second oxygenating gases should be the same oxygenating gas and that this should be oxygen or a free oxygen containing gas mixture such as air or oxygen-enriched air.

It is possible for part or all of the second metal halide to consist of an unreacted excess of the first metal halide passing into the reaction zone as part of the stream of hot gas. Similarly, it is possible for part or all of the second oxygenating gas to consist of an unreacted excess of the first oxygenating gas passing into the reaction zone as part of the stream of hot gas. Of course, it is not possible for all the second metal halide and all the second oxygenating gas to be supplied in this way simultaneously, since at least part of one of these two reactants must be introduced through the plurality of spaced inlets in the reaction zone.

The fuel gas in the initial mixture may be any gas which will burn in the oxygenating gas to provide the necessary heat for the oxidation of the first metal halide. This normally means that the fuel gas should be able to raise the temperature of the initial gas mixture to at least 600° C., preferably to at least 800° C.

The preferred fuel gas is carbon monoxide. Other fuel gases may be used if desired; examples are a hydrogen-containing gas, for example a hydrocarbon such as ethane, propane and butane.

The initial gas mixture may be formed in any convenient manner, for example the first metal halide may be vaporized at the appropriate rate and the vapor thus produced may be mixed wtih the appropriate quantity of oxygenating gas and fuel gas in a mixing device before being passed to a burner where the initial gas mixture is burnt. On a small scale, one convenient method is to pass some of the oxygenating gas through the first metal halide (particularly where this halide is a liquid) maintained at an appropriate temperature to ensure that the oxygenating gas becomes mixed with the desired amount of the metal halide vapor. The remaining oxygenating gas may then be mixed with the fuel gas and the two streams joined and mixed before burning.

It is desirable to preheat the initial gas mixture before it is burnt. This may be accomplished either by heating the constituents before forming them into the initial gas mixture, or by first forming such mixture and then heating the mixture. Preheating should be sufficient at least to ensure that any normally liquid or solid constituents of the mixture remain in the vapor phase. Preheating to a temperature of at least about 150° C., preferably at least 250° C., has been found very convenient where titanium tetrachloride is the first metal halide.

The temperature of the gas mixture should, of course, be maintained below that at which the constituents will react until the stage when the mixture is to be burnt.

It is essential in the present process to form a hot gas stream which contains initial solid metal oxide particles of smaller mean particle size than that of the metal oxide which is to be the product recovered from the reaction zone. In the case where this product is pigmentary titanium dioxide particles, it will usually be desired that the latter should have a mean particle size in the range of about 0.15 to about 0.35 micron; hence, the mean particle size of the initial solid metal oxide will normally be either below this range or, at least, not above the middle of this range (depending upon the exact desired particle size of the final product.) In general, it is preferred that the initial solid particles should have a mean size in the range of about 0.01 to about 0.25 micron, more preferably about 0.1 to about 0.2 micron, in order to produce pigmentary titanium dioxide of the best quality for normal purposes.

It is essential in the present process to include, in the initial gas mixture, at least sufficient fuel gas to maintain the burning mixture at a temperature at which the first metal halide vapor is oxidized by the oxygenating gas to the corresponding metal oxide. This is generally, and particularly when the first metal halide is titanium tetrachloride, at least 600° C. and preferably at least 800° C.

The amount of fuel gas required to maintain the desired temperature will depend, inter alia, on the particular fuel used, on the temperature to which the mixture or any of its constituents has been preheated, and on the temperature of the zone in which the mixture is burnt. The amount of fuel gas required in any particular circumstances can readily be found by trial and error.

It has been found convenient to include, in the initial gas mixture, an amount of first metal halide which will give a metal halide/fuel gas molar ratio in the range of about 1:2 to about 1:4, particularly when the fuel gas is carbon monoxide.

The amount of oxygenating gas in the initial gas mixture is preferably at least sufficient to oxidize the first metal halide to the corresponding oxide and to burn substantially all the fuel gas. It is, however, within the scope of the present invention to introduce excess oxygenating gas with the initial gas mixture and to allow this excess to pass into the reaction zone wherein it is utilized in the oxidation of at least some of the second metal halide.

The initial gas mixture is preferably ignited after being passed through a mixing chamber (for example a chamber containing particulate inert matter such as glass beads). The ignition is preferably effected by thereafter passing the mixture through a burner which comprises a passage merging into a plurality of channels or similar devices (preferably of metal) to break up the gas flow into separate, and preferably parallel, streams. One effect of such apparatus is to reduce the possibility of "flash back" in the burner should the gas velocity be reduced. It also assists in providing steady gas flow conditions and reducing turbulence in the gas stream.

It is advisable, when using such a burner, to ensure that the temperature of the metal parts of the burner does not rise too high, for example, above about 500° C. If necessary, cooling can be applied to the burner, for example, by providing the burner with a jacket or the like through which may be circulated a coolant such as air, water or one or more of the components of the initial gas mixture.

It has been found that by the use of such a burner the oxidation of the oxidizable components of the mixture may be very efficient and the initial solid metal oxide particles can be of very uniform particle size, for example, having a standard deviation (as described in No. 254,007) in the range of about 1.25 to 1.30.

An apparatus useful for carrying out the process of the present invention is generally described in the above mentioned application Ser. No. 254,007 and in the continuation-in-part thereof, viz., Arkless and Groves U.S. application Ser. No. 549,297, now U.S. 3,463,610. FIGS. 1 through 3 are based on these applications coupled with the description presented herein.

Figure 1:
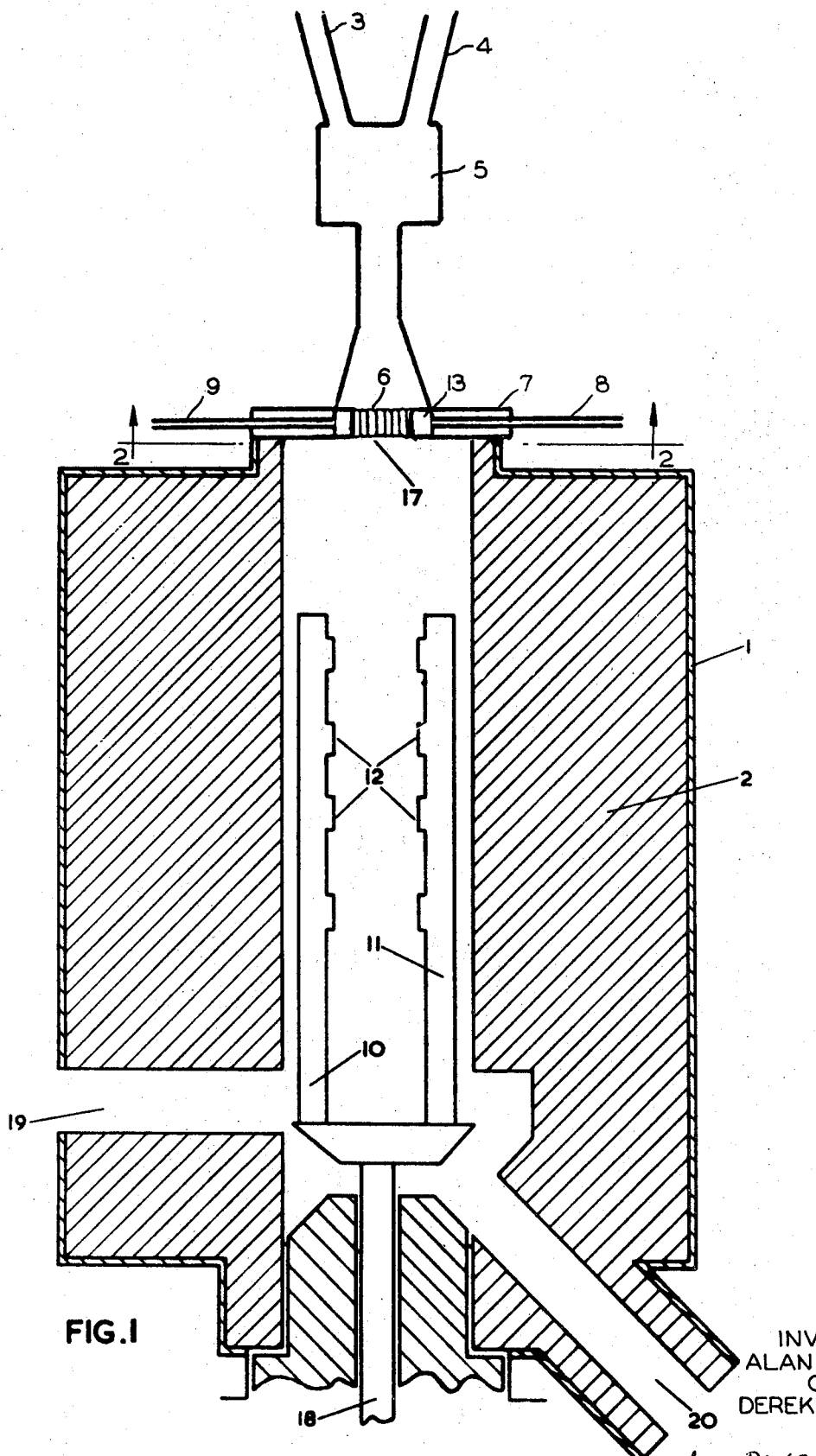
FIG. 1 is a section through a reactor useful for carrying out the process of the present invention.
Figure 2:
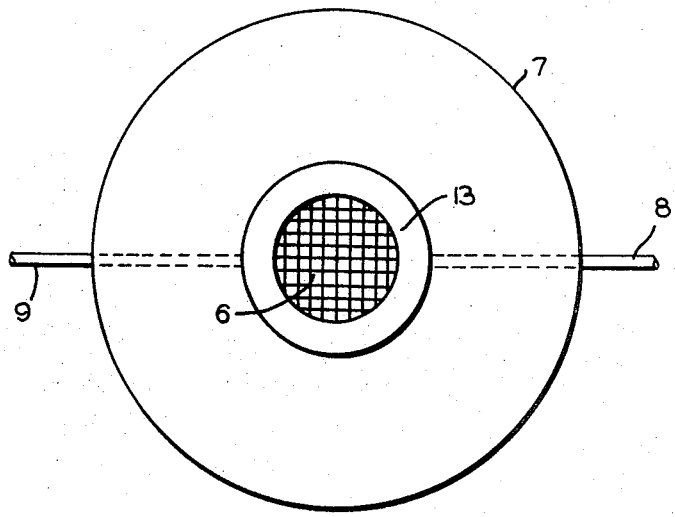
FIG. 2 is a section along lines 2—2 of FIG. 1 showing generally the structure of the burner.
Figure 3:
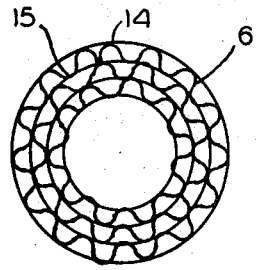
FIG. 3 illustrates an alternate burner assembly.

FIG. 1 shows a reactor shell 1 containing a chlorine-resistant refractory lining 2 enclosing a reaction zone. Conduits 3 and 4 are feed lines in the reactors, e.g., titanium tetrachloride, oxygen and a fuel gas such as carbon monoxide. In one embodiment a preheated mixture of titanium tetrachloride and oxygen is introduced through conduit 3 and a preheated mixture of oxygen and carbon monoxide is introduced through conduit 4, to mixing chamber 5. Feed streams should not, of course, be preheated to such a temperature that the components will react in the mixing chamber. In mixing chamber 5, a homogenous mixture is formed; adequate mixing may be obtained by appropriate baffling in the mixing chamber 5, e.g., by the provision of glass beads in the mixing chamber. The homogenous gas mixture then passes to the burner (details of which are shown in FIG. 2 and an alternate form of which is shown in FIG. 3). The burner is provided with a plurality of channels which break up the flow of gas into separate and preferable parallel streams. The burner is provided with a suitable jacket, 13, through which coolant can be passed to effect cooling of the flow channels in the embodiment shown. Coolant is introduced into conduit, 8, and withdrawn from conduit 9. The burner and conduits for coolant are supported in the plate 7 and define the top of reactor, 1. The gases from mixture, 5, pass through the burner into reactor 3 at port 17.

Within the reaction zone, 3, are reactant supply pipes 10 and 11 which supply inlets 12 with premixed reactants (e.g., TiCl$_4$ and oxygen) at these levels. The supply pipes 10 and 11 are made of nickel and can be cooled by coolant, e.g., air, which is circulated within the pipe without entering the reaction zone.

In the embodiment shown, premixed reactants (e.g., titanium tetrachloride and oxygen) are introduced into the reaction zone at four levels via common supply duct 18, supply pipes 10 and 11 and inlets 12. Titanium dioxide product is withdrawn via discharge port 19 and any coarse particles which form in the reaction zone and fall to the bottom are withdrawn periodically through discharge duct 20.

The burner shown in FIGS. 1 and 2 comprises intersecting strips providing a plurality of parallel passages. FIG. 3 represents another embodiment and comprises concentric metal rings or spirals 14, having projections or corrugations 15. For example, on the side facing the center of the burner in FIG. 3 only a few of the projections are shown for simplicity sake but it is readily apparent that parallel passages can be easily formed in such a structure.

The temperature in the reaction zone may be any temperature at which the second metal halide will be converted to metal oxide by the second oxygenating gas. Usually a temperature of at least 600° C., preferably at least 800° C., is desirable, particularly if the second metal halide is titanium tetrahalide. A temperature from 900° C. to 1500° C., preferably up to about 1200° C., has been found particularly suitable for the production of pigmentary titanium dioxide. Unless auxiliary heat is provided in the reaction zone, the hot gas stream entering it should desirably be at a sufficient temperature for the second metal halide to be converted to metal oxide by the oxygenating gas.

In order that the hot gas stream entering the reaction zone should contribute as much heat as practicable to the reaction zone, it is desirable to pass this hot stream into the reaction zone substantially immediately upon its being formed by the burning of the initial gas mixture. For this purpose, the reaction zone may, if desired, form a continuation of the zone surrounding the flame in which takes place the burning of the initial gas mixture. For example, the initial gas mixture may be burned in the lower or upper part of a shaft furnace and the second metal halide and/or oxygenating gas may be introduced into the remaining part of the shaft furnace. By such rapid introduction of the hot gas stream into the reaction zone, it is ensured that the finely-divided initial solid metal oxide particles do not flocculate and, therefore, can provide suitable nuclei upon which the deposition of the oxide formed from the second metal halide in the reaction zone can take place, so that a final product of optimum and uniform particle size is obtainable.

The second metal halide and second oxygenating gas may be introduced into the reaction zone in the process of the present invention by any suitable method, for example, by any of the methods set out in our copending patent application No. 254,007. Such methods include introducing the gases separately or as a mixture and the introduction either by means of conduits through the walls of the reactor or by means of a pipe or pipes which may constitute the combined scraper/injector described and claimed in our copending Groves and Jones U.S. pat. application No. 417,130, now U.S. 3,391,998.

As noted in No. 254,007, the introduction of the second metal halide and/or the second oxygenating gas into the reaction zone, unless these are preheated to reaction temperature, will cause a drop in the temperature of the gas stream passing through the reaction zone. The subsequent oxidation of the second metal halide (where this is exothermic) may, however, raise the temperature of the gas stream once more and thus the temperature of the gas stream can be maintained above the oxidation temperature of the gas stream can be maintained above the oxidation temperature until the point is reached at which more reactants are introduced and the oxidation is repeated. By this means, it is possible to provide an autothermal process during this stage of the invention provided the temperature of the gas stream does not fall below that at which the second metal halide is oxidized to metal oxide by the oxygenating gas.

It is, of course, within the scope of this invention to operate the process in a nonautothermal manner, i.e. to supply heat to the reaction zone, for example, by burning a fuel within the zone or from an external source, if desired.

In accordance with the invention, there must be at least two introductions of the second metal halide and/or the second oxygenating gas into the reaction zone and it is envisaged that at least four additions and possibly even ten or twenty or more such additions might be made to give metal oxide of the best quality.

The rate of addition of reactants (the second metal halide and/or the second oxygenating gas) introduced into the reaction zone at any one introduction is preferably such that, when any given reactants introduced have reacted, the weight of metal oxide formed from that introduction is from about 1.01 to about 10 and preferably from 1.10 to 2.0 times the total weight of metal oxide present in the gas stream before the introduction.

In addition to the main metal halide or halides and oxygenating gas, it may be desirable to introduce other substances, so as to control or modify the properties of the final product. For example, where the final product is to be pigmentary titanium dioxide, such other substances might include the halides of aluminum, silicon, cerium, zircon and/or boron and/or water vapor and/or or a subhalide of titanium and/or a source of alkali metal ions (e.g., potassium ions). Such other substances may be introduced into the initial gas mixture or they may be introduced later in the reaction zone. If such other substances are introduced directly into the reaction zone, and if they comprise any metal halides, the oxides produced from such metal halides may form a coating upon the particles, particularly if such metal halides are introduced after the last introduction of the second metal halide.

The finely-divided metal oxide product may be recovered from the reaction zone by any suitable method. For example, the gas stream which leaves the reaction zone may carry the product away. This stream may be cooled and passed through filters to recover the product. Halogen liberated in the process may be recovered, for example, by liquefaction, and re-used if desired, to produce more of the first and/or the second metal halide.

An additional advantage of the process of the present invention is that less heat, for example, in the form of fuel gas, is required than in processes in which the *whole* of the metal halide and oxygenating gas used is passed through a single burner. Where *all* the reactants pass through the burner sufficient heat must be applied to heat all the reactants to reaction temperature and where this is accomplished by the burning of a fuel gas, large quantities of the latter are required. In the case of carbon monoxide in particular, gas of acceptable purity is expensive and available only in limited amounts.

If a hydrogen-containing fuel is used, hydrogen halide (e.g., chloride) may be produced which represents a loss of halogen and also contaminates the halogen liberated in the process and makes it difficult to recover.

In the present process, however, only a small proportion of the total reactants, for example 25% or less, may need to be heated by the burning of the fuel gas. The present process thus greatly reduces the cost (and supply problems) of a suitable fuel gas. It also reduces the problem of contamination if there is used a fuel such as the hydrogen-containing fuel mentioned above. Thus, if a hydrogen-containing fuel is used, the amount of the hydrogen halide which will be formed in the process will be very much less than would be formed if sufficient hydrogen-containing fuel had to be introduced into the process to provide heat for the oxidation of all the metal halide used in the process.

The following examples illustrate the present invention.

EXAMPLE 1

A reactor was set up comprising a silica tube 6" in diameter and 27" in length.

In the side wall at the lower end of the reactor there was provided a side arm through which gaseous and solid reaction products could be withdrawn from the reactor through a cloth filter (which retained particles of metal oxide).

The lower end of the reactor was sealed and centrally through the sealed end was passed a silica tube, the end of which was sealed and which was provided with three holes in its side 1", 4" and 9" respectively from the sealed end. This formed the injector.

In the top of the reactor and reaching down to within about 6" of the sealed end of the injector was placed a burner consisting of a tube 15 mm. internal diameter to which could be supplied premixed preheated titanium tetrachloride, oxygen and carbon monoxide. Over the end of the burner was placed a helix of aluminium strip having regularly spaced projections on one side thus forming, between these projections, a number of separate channels through which the gas passed before burning.

A heat-resistant glass channel was provided around the periphery of the burner (and metal helix) through which coolant could be circulated.

The reactor was surrounded by an electric furnace.

In order to carry out the process, substantially dry carbon monoxide and oxygen (containing sufficient $AlCl_3$ vapor to give 2% alumina on the $TiO_2$ produced) were heated to above 300° C. and passed into the burner through a mixing chamber. The mixture was then ignited and when the flame was established, premixed titanium tetrachloride (containing sufficient $SiCl_4$ vapor to give 0.25% silica on the $TiO_2$ produced) and oxygen, also heated to 300° C., were passed into the mixing chamber.

The rates of flow of the gases were:

| | Litres/minute |
|---|---|
| Carbon monoxide | 2 |
| Oxygen (with CO) | 1 |
| $TiCl_4$ | 0.5 |
| Oxygen (with $TiCl_4$) | 1 |

There was then introduced through the injector tube a mixture of titanium tetrachloride and oxygen preheated to a temperature of 300° C.

The rates of gas flow introduced through the injector were:

| | Litres/minute |
|---|---|
| $TiCl_4$ | 1 |
| Oxygen | 1 |

The electric furnace was adjusted to maintain a temperature in the reactor of 1050° C. during the process.

The $TiO_2$ produced in the process *before* the $TiCl_4$/ oxygen mixture was introduced through the injector was recovered and examined and *after* the introduction of $TiCl_4$/ oxygen mixture through the injector (and when steady state conditions were established) the material produced was again recovered and examined.

The material produced initially consisted of rutile titanium dioxide particles of a mean weight size of about $0.15\mu$ and a standard deviation of about 1.28.

The material produced *after* the introduction of the $TiCl_4$/oxygen mixture through the injector consisted of rutile titanium dioxide particles having a mean weight size of about $0.23\mu$ and a standard deviation of about 1.35. The material was of excellent brightness and had a tinting strength of 1800 (on the Reynolds scale).

EXAMPLE 2

A burner was fabricated which was similar in design to that described in Example 1. The burner consisted of an aluminum tube 37 cms. in length and 5.7 cms. internal diameter. One end of the tube comprised a closed annular channel through which a coolant could be circulated and the volume surrounded by the coolant channel formed the burner orifice. This was 5.7 cms. internal diameter and 3.8 cms. in depth. Into this orifice was fitted an aluminum matrix as described in Example 1.

The burner, with the burner orifice uppermost, was fitted into the base of the reactor comprising a silica tube 48" in length and 12" internal diameter having an outlet duct in the upper end of the reactor wall through which the products of reaction could be withdrawn.

Provision was made for heating the walls of the reactor electrically.

Centrally through the top of the reactor was placed a silica tube, the lower end of which was sealed. The tube wall was perforated at distances of 1", 6" and 12" from the sealed end of the tube with three holes at each level equidistantly spaced around the circumference of the tube. The sealed end of this perforated tube (which formed the injector) was positioned 18" from the face of the burner.

The wall of the reactor was initially heated to about 900° C. and a premixed and preheated mixture of carbon monoxide (28 litres/min.) and oxygen (14 litres/min.) was introduced through the burner, the tube of which was packed with glass helices.

When the flame was established (which was about 18" in length) a preheated titanium tetrachloride vapor/oxygen mixture was also introduced into the burner. Preheating of the wall of the reactor was then discontinued and air was circulated through the coolant channel surrounding the burner orifice.

The amount of titanium tetrachloride passed through the burner was varied to give titanium tetrachloride/ carbon monoxide molar ratios between 0.18 and 0.35 and it was found that the flame was maintained satisfactorily throughout these variations.

The mean weight particle size of the titanium dioxide produced was in the range $0.10\mu$ to $0.15\mu$.

The temperature to which the titanium tetrachloride/ oxygen mixture was preheated was also varied between 200° C. and 450° C. without ill-effect upon the flame or upon the particle size of the titanium dioxide produced. During this time the carbon monoxide was preheated to a temperature in the range of about 200° C. to 450° C.

A titanium tetrachloride/oxygen mixture (molar ratio 1:1.1) preheated to a temperature of 250° C. was introduced through the injector at a flow rate of 28 litres/ min. and the finely-divided titanium dioxide produced in the process was collected and examined for particle size.

The titanium dioxide was found to have a very uniform particle size and to have a mean weight particle size (which varied with the size of the $TiO_2$ produced in the burner) in the range of about $0.20\mu$ to $0.25\mu$.

The product had excellent pigmentary properties.

What is claimed is:

1. A process for the production of finely-divided *white* metal oxide comprising forming an initial gas mixture containing the vapor of a first oxidizable metal halide, a first oxygenating gas and a fuel gas, the quantity of the fuel gas being at least sufficient to maintain the necessary temperature for the first metal halide to be converted to the corresponding oxide by the first oxygenating gas on the burning of the fuel; burning the initial gas mixture so as to produce a stream of hot gas containing initial solid particles of metal oxide of smaller mean particle size than that of the metal oxide to be produced; passing such stream of hot gas containing such initial solid particles into a reaction zone; introducing into the reaction zone a second oxidizable metal halide and a second oxygenating gas, at least one of these two reactants being introduced through a plurality of inlets spaced along the length of the zone in the direction of the gas flow; maintaining the necessary temperature in the reaction zone for the second metal halide to be converted to *white* metal oxide by the second oxygenating gas; and thereafter recovering finely-divided white metal oxide from the reaction zone.

2. The process of claim 1 in which the first oxidizable metal halide and the second oxidizable metal halide are each selected from the group consisting of aluminium trihalide, silicon tetrahalide, titanium tetrahalide and zirconium tetrahalide.

3. The process of claim 1 in which the first metal halide is used in an amount such as to give a molar ratio of the first metal halide to the fuel gas of from 1:2 to 1:4.

4. The process of claim 1 in which at least one of the second metal halide and the second oxygenating gas is introduced through at least three inlets spaced along the length of the reaction zone in the direction of the gas flow.

5. The process of claim 4 in which there at at least 10 inlets.

6. The process of claim 1 in which the reactant being introduced through a plurality of inlets spaced along the length of the zone in the direction of the gas flow is introduced at a rate such that the amount introduced through each inlet, when it has reacted to form the metal oxide, yields a weight of such metal oxide which is from 1.01 to 10 times the total weight of metal oxide present in the stream of hot gas before such introduction.

7. A process for the production of finely-divided *white* metal oxide comprising forming a substantially homogeneous initial gas mixture containing the vapor of a first oxidizable metal halide, a first oxygenating gas and a fuel gas, the fuel gas being in a quantity at least sufficient to maintain the necessary temperature for the first metal halide to be converted to the corresponding oxide by the first oxygenating gas by the burning of the fuel, and the first oxygenating gas being in a quantity in excess of that required to convert the first metal halide to the corresponding oxide; burning the initial gas mixture so as to produce a stream of hot gas containing initial solid oxide particles of smaller mean particle size than that of the metal oxide to be produced and containing the excess of the first oxygenating gas; passing such stream of hot gas substantially immediately into the reaction zone and introducing into the reaction zone a second oxidizable metal *halide* through a plurality of inlets spaced along the zone in the direction of the gas flow while maintaining the temperature in the reaction zone at over 900° C. so as to convert the second metal halide to *white* metal oxide; finely-divided *white* metal oxide thereafter being recovered from the reaction zone.

8. A process for the production of finely-divided white metal oxides comprising (1) forming the vapor of a first oxidizable metal halide, a first oxygenating gas and a fuel gas into a substantially homogeneous initial gas mixture containing an amount of said first oxidizable metal halide in excess of the amount equivalent to the amount of said first oxygenating gas and containing an amount of said fuel gas sufficient to maintain on burning a reaction between said first metal halide and said first oxygenating gas; (2) producing a stream of hot gas containing initial solid particles of metal oxide and the excess of said first oxidizable metal halide by burning said initial gas mixture; (3) immediately passing said stream of hot gas into a reaction zone; (4) flowing said stream of hot gas through said reaction zone while introducing a second oxygenating gas into said reaction zone through a plurality of inlets spaced along the length of said zone in the direction of the gas flow while maintaining a temperature of from 900° C. to 1500° C. in said reaction zone so that said second oxygenating gas reacts with said excess first oxidizable metal halide in said stream of hot gas to form white metal oxides at least partly deposited on said initial solid particles to produce fine-divided white metal oxide particles; and (5) recovering said finely-divided white metal oxide particles from said reaction zone.

9. A process for producing finely-divided titanium dioxide particles comprising forming a first oxidizable metal chloride, a first oxygenating gas and a fuel gas into a substantially homogeneous initial gas mixture, the first oxidizable metal chloride being selected from the group consisting of aluminum trichloride, silicon tetrachloride, titanium tetrachloride and zirconium tetrachloride, the fuel gas being present in an amount at least sufficient to produce a temperature of over 900° C. when it is burnt; burning the initial gas mixture to produce a stream of hot gas containing initial solid particles of metal oxide of mean particle size from 0.01 to 0.25 micron; substantially immediately passing the stream of hot gas into a reactor having a plurality of inlets spaced along the length of the reactor in the direction of the stream of hot gas and maintaining the reactor at a temperature from 900° C. to 1500° C. while introducing titanium tetrachloride and a second oxygenating gas into the reactor, at least one of the titanium tetrachloride and the second oxygenating gas being introduced through the inlets, whereby there is formed titanium dioxide which is at least partly deposited on the initial solid particles to form a final product comprising titanium dioxide particles having a mean particle size from 0.15 to 0.35 micron.

10. The process of claim 9 in which the initial solid particles have a mean size from 0.1 to 0.2 micron.

11. The process of claim 9 in which the first metal halide is used in an amount such as to give molar ratio thereof to the fuel gas of from 1:2 to 1:4.

12. The process of claim 9 in which the burning of the initial gas mixture is effected after passing the initial gas mixture through a mixing chamber.

13. The process of claim 12 in which the mixing chamber comprises a passage merging into a plurality of chambers to break up the flow of the initial gas mixture into separate streams.

14. The process of claim 9 in which the first oxidizable metal chloride is titanium tetrachloride.

15. The process of claim 14 in which the initial gas mixture is preheated to at least 250° C. before being burnt.

16. The process of claim 9 in which the plurality of inlets comprises at least 3 inlets.

17. The process of claim 16 in which the plurality of inlets comprises at least 10 inlets.

References Cited

UNITED STATES PATENTS

| 2,964,386 | 12/1960 | Evans et al. | 23—202 |
| 3,068,113 | 12/1962 | Strain et al. | 106—300 |
| 3,078,148 | 2/1963 | Belknap | 23—202 |
| 3,147,077 | 9/1964 | Callow | 23—202 |
| 3,275,411 | 9/1966 | Freeman et al. | 23—202 |

EDWARD STERN, Primary Examiner

U.S. Cl. X.R.

23—1, 140, 142, 149, 182, 184; 106—300